US008438546B2

(12) United States Patent
Wolf

(10) Patent No.: US 8,438,546 B2
(45) Date of Patent: May 7, 2013

(54) SYSTEM AND METHOD FOR MITIGATING REPEATED CRASHES OF AN APPLICATION RESULTING FROM SUPPLEMENTAL CODE

(75) Inventor: Christopher Wolf, Raleigh, NC (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/205,827

(22) Filed: Aug. 9, 2011

(65) Prior Publication Data
US 2011/0296247 A1 Dec. 1, 2011

Related U.S. Application Data

(62) Division of application No. 11/462,641, filed on Aug. 4, 2006, now Pat. No. 8,020,149.

(51) Int. Cl.
G06F 9/44 (2006.01)

(52) U.S. Cl.
USPC ........... 717/127; 717/124; 717/126; 717/128; 714/38.1; 714/38.13

(58) Field of Classification Search .................. 717/124, 717/127
See application file for complete search history.

(56) References Cited

U.S. PATENT DOCUMENTS

| 5,291,494 | A | 3/1994 | Bruckert et al. |
| 5,790,779 | A | 8/1998 | Ben-Natan et al. |
| 5,848,274 | A | 12/1998 | Hamby et al. |
| 5,949,998 | A | 9/1999 | Fowlow et al. |
| 5,974,569 | A | 10/1999 | Nickles |
| 6,000,046 | A | 12/1999 | Passmore |
| 6,006,279 | A | 12/1999 | Hayes |
| 6,016,474 | A | 1/2000 | Kim et al. |
| 6,083,277 | A | 7/2000 | Fowlow et al. |
| 6,094,528 | A * | 7/2000 | Jordan .......................... 717/115 |
| 6,108,100 | A | 8/2000 | Mcvey et al. |
| 6,163,858 | A | 12/2000 | Bodamer |
| 6,247,056 | B1 | 6/2001 | Chou et al. |
| 6,266,788 | B1 | 7/2001 | Othmer et al. |
| 6,330,689 | B1 | 12/2001 | Jin et al. |
| 6,634,019 | B1 * | 10/2003 | Rice et al. ...................... 717/127 |
| 6,763,517 | B2 | 7/2004 | Hines |
| 6,785,850 | B2 | 8/2004 | Dzoba et al. |
| 6,789,157 | B1 | 9/2004 | Lilja et al. |
| 6,845,505 | B1 | 1/2005 | Adunuthula et al. |

(Continued)

OTHER PUBLICATIONS

"U.S. Appl. No. 11/462,641, Non-Final Office Action mailed Sep. 28, 2010", 18 pgs.

(Continued)

Primary Examiner — Chameli Das
(74) Attorney, Agent, or Firm — Fish & Richardson P.C.

(57) ABSTRACT

Provided is a method for mitigating the effects of an application which crashes as the result of supplemental code (e.g., plug-in), particularly a plug-in from a source other than the source of the operating system of the device or the source of the application that crashes. The method includes executing the application. As the application is running, it may be monitored to determine if normal execution of instructions ceases. When that occurs, the system will make a determination if code from a supplemental code module was the cause of the crash, and will make an evaluation if that supplemental code module is from a source other than the source(s) of the operating system and application in question. In some implementations, remedial steps may be provided, such as providing information on subsequent executions of the application.

29 Claims, 12 Drawing Sheets

U.S. PATENT DOCUMENTS

| | | | |
|---|---|---|---|
| 6,944,849 | B1 | 9/2005 | Glerum et al. |
| 6,996,816 | B1 * | 2/2006 | Bohan ........................... 717/169 |
| 7,032,212 | B2 | 4/2006 | Amir et al. |
| 7,321,988 | B2 | 1/2008 | Guo et al. |
| 7,343,588 | B2 | 3/2008 | Bates et al. |
| 7,631,318 | B2 * | 12/2009 | Cottrille et al. ............... 719/328 |
| 7,702,959 | B2 | 4/2010 | Hwang et al. |
| 7,774,172 | B1 * | 8/2010 | Yunt et al. ......................... 703/2 |
| 7,797,421 | B1 * | 9/2010 | Scofield et al. ............... 709/224 |
| 8,200,543 | B2 * | 6/2012 | Varadarajan et al. ........ 705/26.1 |
| 2002/0040470 | A1 | 4/2002 | Guthrie et al. |
| 2002/0056047 | A1 | 5/2002 | Lehman |
| 2002/0104077 | A1 | 8/2002 | Charnell et al. |
| 2002/0129303 | A1 | 9/2002 | Karppanen |
| 2002/0138799 | A1 | 9/2002 | Takano |
| 2003/0051186 | A1 * | 3/2003 | Boudnik et al. ................... 714/2 |
| 2003/0093783 | A1 | 5/2003 | Nelson |
| 2003/0120776 | A1 * | 6/2003 | Avvari et al. .................. 709/225 |
| 2003/0135842 | A1 * | 7/2003 | Frey et al. ..................... 717/121 |
| 2004/0060045 | A1 * | 3/2004 | Hind et al. ..................... 717/174 |
| 2004/0225923 | A1 | 11/2004 | Teegan et al. |
| 2006/0005078 | A1 * | 1/2006 | Guo et al. ........................ 714/38 |
| 2006/0136784 | A1 | 6/2006 | Prescott et al. |
| 2007/0282711 | A1 * | 12/2007 | Ullman et al. .................. 705/27 |
| 2008/0052677 | A1 | 2/2008 | Wolf |
| 2010/0192132 | A1 * | 7/2010 | Yuan et al. .................... 717/128 |

OTHER PUBLICATIONS

"U.S. Appl. No. 11/462,641, Notice of Allowance mailed May 5, 2011", 16 pgs.

"U.S. Appl. No. 11/462,641, Response filed Mar. 28, 2011 to Non Final Office Action mailed Sep. 28, 2010", 6 pgs.

"Technical Note TN2123", [online] (c) 2007 Apple Comuter. [retrieved on Jan. 3, 2008]. Retrieved from the Internet: <URL:http://developer.apple.com/technotes/tn2004/tn2123.html>, 13 pgs.

"Windows Error Reporting Under the Covers", [online]. (c) 2007 O'Reilly Media, Inc. [retrieved on Jan. 2, 2008]. Retrieved from the Internet: <URL:http://windowsdevcenter.com/lpt/a/4690>, 5 pgs.

Liu, Peng, et al., "Avoiding Loss of Fairness Owing to Process Crashes in Fair Data Exchange Protocols", IEEE, (Jun. 28, 2000), 10 pgs.

Mangan, T., "When Applications Crash Part I—Watson", (c) 2006 TMurgent Technologies, (Apr. 1, 2006), 5 pgs.

Mangan, T., "When Applications Crash Part II—WER", (c) 2006 TMurgent Technologies, (Apr. 1, 2006), 9 pgs.

Peng Liu et al., Avoiding Loss of Fairness Owing to Process Crashes in Fair Data Exchange Protocols, IEEE, Jun. 28, 2000, 10 pages.

\* cited by examiner

SYSTEM AND METHOD FOR MITIGATING REPEATED CRASHES OF AN APPLICATION RESULTING FROM SUPPLEMENTAL CODE

CLAIM OF PRIORITY

This application is a divisional of and claims the benefit of priority under 35 U.S.C. §120 to U.S. patent application Ser. No. 11/462,641, Filed on Aug. 4, 2006, which is hereby incorporated by reference herein in its entirety.

TECHNICAL FIELD

The present application relates generally to computer programs. More specifically, example embodiments are directed to a system, method and machine-readable medium for mitigating repeated crashes of an application resulting from supplemental code (e.g., plug-ins) utilized by the application.

BACKGROUND

A modern general-purpose computer system uses an operating system (OS) to manage the hardware and software resources of the computer. The OS is a software program that performs basic tasks, such as controlling and allocating memory, prioritizing the processing of instructions, controlling input and output devices, facilitating networking, and managing files. The OS also provides application program interfaces (APIs or interfaces) to enable the application programs (applications) to interact with the hardware and software resources as well as with other application programs.

An application, as well as one or more libraries which are linked either statically or dynamically to the application, may use supplemental code (e.g., plug-ins) to perform certain functionality that the application and the libraries have not been programmed to perform. A plug-in is a code module that is not part of the application or library, but which can be accessed by the application or library to extend its respective functionality. Although a variety of different plug-ins exist, a typical example may include a plug-in that provides display capabilities for a certain graphics format that a web browsing application does not support natively. The application typically provides a way for a plug-in to register with the application, and the application and the plug-in provide respective interfaces via which data is exchanged between the application and the plug-in. Other types of supplemental code are also possible.

The circumstance and terminology of an application "crashing" is well-known to those familiar with computers and with the art of computer programming. As used herein, the term "crash" will refer to any instance in which the execution of the application is halted abnormally, whether as a result of the application freezing, or as a result of the application aborting. In such cases, an application will unexpectedly (not in response to system or user control) cease normal execution of its instructions.

The aforementioned variety of plug-ins may be provided by different developers. More specifically, plug-ins may be provided by the OS developer, the application developer or any other third party developer. Although it is possible that plug-ins provided by the OS developer and by the application developer may cause the application to crash, the more typical case arises when a crash of the application is caused by a plug-in of a third party developer (e.g., developer other than the OS developer and application developer). This occurs in part because the OS developer and the application developer cannot typically test the OS or the application against all third party plug-ins. For example, an application crash may be caused because the third-party authored plug-ins may use application program interfaces (APIs) that are not authorized or documented by the developer of the application or by the developer of the OS and these unauthorized or undocumented APIs may behave differently in newer versions of the OS or application. Similarly, an application may inadvertently rely on undocumented or unsupported APIs in a plug-in and newer versions of that plug-in may remove or change these APIs in such a way that may cause an application crash. It is also noted that generic programming errors in the plug-in may also cause the application to crash.

In such circumstances, determination of which plug-in has caused the application to crash is important in order for a user to take appropriate corrective action. Certain applications (e.g., crash reporters) exist which provide the user with a description of why the application has crashed. However, it is often difficult for most users to determine information from crash reporters. In particular, it is typically difficult for the user to determine whether the application has crashed because of a plug-in, and if so, to identify the offending plug-in. Furthermore, it is often difficult for the user to take appropriate corrective action to make sure that the application does not crash again.

SUMMARY

Embodiments described herein enable a determination of whether an application crash was caused, in part, by a supplemental code module (e.g., plug-in) to the application from a source other than the source of the application and/or a source other than the source of the operating system. When a supplemental code module is determined to be from a source other than the source of the application and the source of the operating system of the computing device on which the supplemental code module is installed, it is characterized as being of "third party" origin. As will be apparent to those skilled in the art, a "determination" of a status (such as third party origin), or an event (such as a cause of an application crash), as referenced herein, does not necessarily represent a determination with precise accuracy. The precise cause or causes of a crash, for example, may or may not be discernable. Thus, a "determination" as used herein, such as of a status or event, encompasses an estimated or a probable conclusion as to matter at issue.

Once such a determination is made, the system may undertake mitigating steps, or it may interact with the user to determine what steps, if any, to take on subsequent executions of the application. In selected embodiments, when an application crash occurs, the system will examine code modules accessed by addresses in a call stack, and will determine if one or more code modules is from a source other than the source of the application and/or from a source other than the source of the operating system. As described herein, the method may be implemented with existing applications, which are not "aware" of the crash determinations as described in selected embodiments herein. However, applications may also be customized, such as to initiate new API calls, to improve the effectiveness of the determinations by using the methods described herein.

As an example of one selected embodiment, there is provided a method for deciding whether to load one or more supplemental code modules into an application, the method including executing the application, and determining whether the application has crashed since its last execution because of a third party supplemental code module. In one implementation, the method will also cause a user interface to be presented to a user in response to that determination. For example, such a user interface may identify the third party supplemental code module which was determined to be responsible for crashing the application, and in some implementations, may query the user in relation to taking one or more possible actions, or no action. The user's input may be received in response to the query; and one or more actions may be selectively performed, such as, for example, uninstalling, disabling or loading of the third party supplemental code module in accordance with the user's input.

As an example of one system in accordance with the present invention, there is provided a system for deciding whether to load one or more supplemental code modules into an application. In one implementation, the system includes: an operating system adapted to execute the application; a crash determination module adapted to determine whether the application has crashed since its last execution because of a third party supplemental code module. The system may optionally further include an application presentation module adapted to present a user interface to a user, as discussed above.

Further embodiments include, a machine-readable medium including a set of instructions executable by the machine for performing the methods disclosed herein, such as the example identified above.

BRIEF DESCRIPTION OF THE DRAWINGS

Embodiments are illustrated by way of example and not limitation in the figures of the accompanying drawings in which.

DETAILED DESCRIPTION

Mitigation of repeated crashes (failures) of an application resulting from third party code (e.g., plug-ins) is described. In the following description, for the purposes of explanation, numerous specific details are set forth in order to provide a thorough understanding of example embodiments. It will be evident, however, to one skilled in the art that an example embodiment may be practiced without these specific details.

Example embodiments described herein include systems, methods and a machine-readable mediums for mitigating repeated crashes of an application resulting from third party code (e.g., plug-ins).

Figure 1:
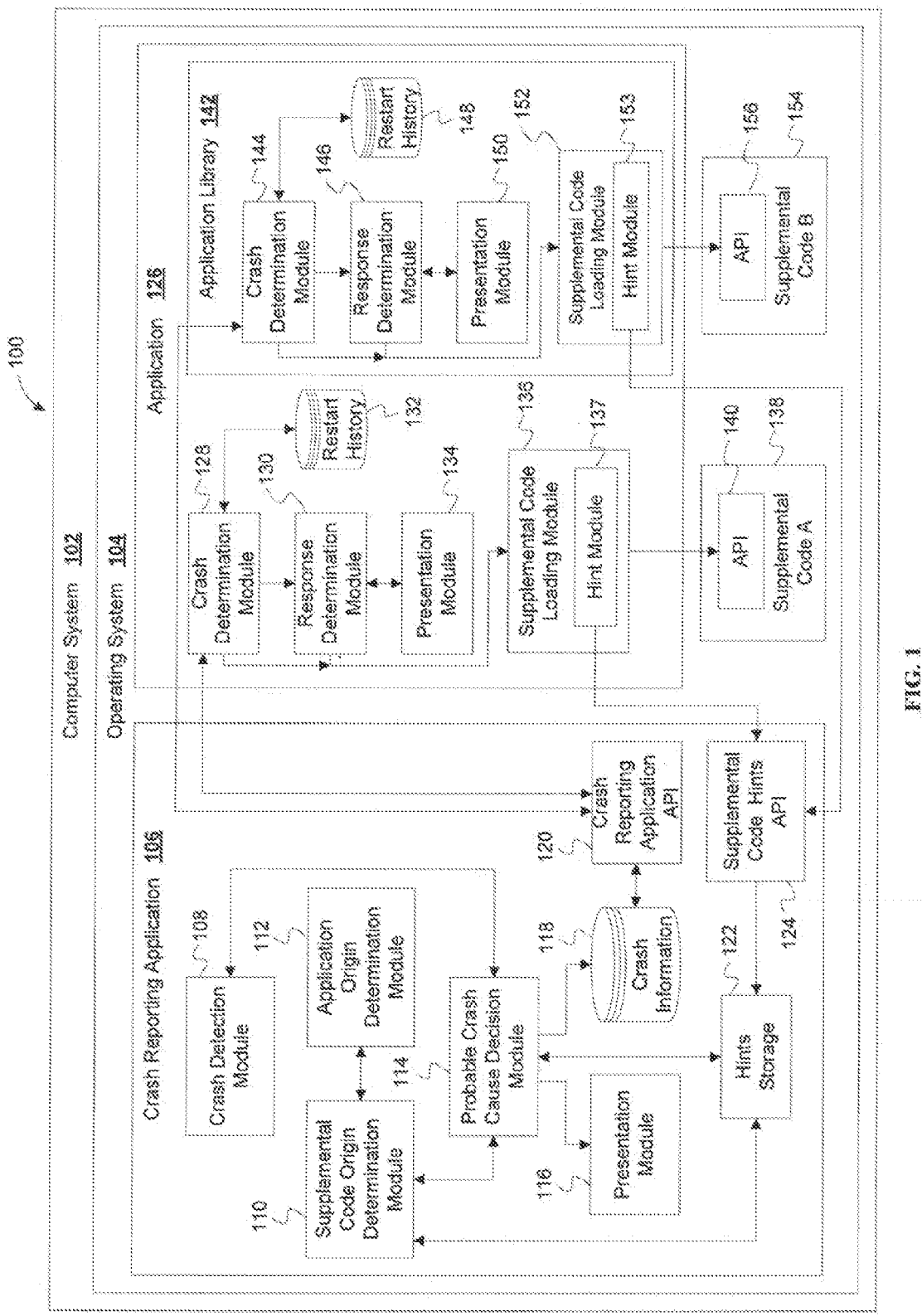
FIG. 1 is an high-level functional block diagram of an example system adapted to mitigate repeated crashes of an application resulting from supplemental code utilized by the application.

FIG. 1 is a high-level functional block diagram of an example system 100 adapted to mitigate repeated crashes of an application 126 resulting from supplemental code A 138 utilized by the application 126. It is noted that similar logic applies to crashes of the application 126 resulting from supplemental code B 154 utilized by an application library 142 linked to the application 126. As will be apparent to those skilled in the art, the division of functions between the various modules depicted in FIG. 1 and described relative thereto is only one of many possibilities. It is contemplated that the described functions may be organized into fewer, more or different modules in alternative implementations. Additionally, the described functions may be replaced with equivalent or alternative functions in accordance with, or guided by the teachings herein. Additionally, modules and other components in FIG. 1 are described as being "connected" to one another. As will be apparent to those skilled in the art, the term "connected" is not used herein in the sense of a physical connection, but is rather used to convey that the modules and components are in cooperative communication with one another, sufficient to provide the described functionality.

The system 100 of FIG. 1 includes a general purpose computer system 102 on which an operating system (OS) 104 may be loaded at start or boot time of the computer system 102. The OS 104 may include Mac OS X®, Windows XP®, Linux® and UNIX®, as well as any other operating system not explicitly enumerated herein that facilitates the subject matter described herein. Within the OS 104, a crash reporting application 106 (e.g., "Crash Reporter" in Mac OS X®) may be executed or instantiated for reporting to a user a probable cause of a crash of the application 126, as will be described herein below with reference to FIG. 1.

Furthermore, within the OS 104, an application 126 may be executed, which may load supplemental code, for example, supplemental code A 138. Although only supplemental code A 138 is described for brevity and clarity, the application 126 may load a variety of different supplemental code (e.g., multiple plug-ins). The application 126 may link to an application library 142 and may execute one or more functions from the application library 142. Just like the application 126, the application library 142 may also load supplemental code, for example, supplemental code B 154. Although only supplemental code B 154 is described for brevity and clarity, the application library 142 may load a variety of different supplemental code (e.g., multiple plug-ins). Furthermore, although only one application library 142 is described for brevity and clarity, the application 126 may link to a plurality of libraries, with each library capable of loading a variety of different supplemental code. The application library 142 may be a statically linked library (linked at compilation time) or a dynamically linked library (linked at runtime).

Further with reference to FIG. 1, the supplemental code loading module 136 may load supplemental code A 138 (e.g., a plug-in) into the application 126, and the application 126 may execute one or more functions therefrom to extend its built-in functionality. Similarly, the supplemental code loading module 152 may load supplemental code B 154 (e.g., a plug-in) into the application library 142, which is linked to the application 126, and the application library 142 may execute one or more functions from supplemental code B 154 to extend its built-in functionality.

Once loaded, communication between the application 128 and supplemental code A 138 may be accomplished via application programming interface (API) 140 and communication between application library 142 and supplemental code B 154 may likewise be accomplished via API 156. For the purposes of the description of the embodiments herein, it should be understood that supplemental code A 138 and/or supplemental code B 154 may cause the application 126 to crash upon loading or upon communication between the application 126 or application library 142 and the respective supplemental code 138, 154. Other components of the application 126 and the application library 142 will be described in greater detail later herein with reference to FIG. 1.

Yet further with reference to FIG. 1, the crash detection module 108 of the crash reporting application 106 is adapted to detect if the application 126 that is executed within the OS 104 crashes, and is further adapted to generate a crash report for the application 126. The crash report includes state information relating to the application, as will be described in greater detail herein below with reference to FIG. 13. More specifically, in some implementations, the OS 104 will monitor to recognize if an application has crashed. Upon a crash of the application 126, the crash detection module 108 of the crash reporting application 106 receives notification from the OS 104 that the application 126 has crashed and generates the crash report that includes a list of modules that the application loaded during execution, including an address range where each module was loaded, and a backtrace of stack frames instantiated during execution of the application, including an address for each frame.

The crash detection module 108 is connected to the probable crash cause decision module 114, which is invoked by the crash detection module 108 upon detecting a crash of the application 126. The probable crash cause decision module 114 determines a probable cause of a crash of the application 126. More specifically, the probable crash cause decision module 114 determines: (1) which code module is likely to have been a cause of the crash of the application 126, and (2) whether that code module is a supplemental code module produced by a third party developer. The probable crash cause decision module 114 is connected to a presentation module 116 that presents to a user the probable cause of the crash of the application 126 as determined by the probable crash cause decision module 114.

Still further with reference to FIG. 1, the probable crash cause decision module 114 stores an entry related to the probable cause of the crash of the application 126 determined by the probable crash cause decision module 114 into a crash information data store 118. Crash information data store 118 may be queried by the application 126 upon restarting. The probable crash cause decision module 114 is also connected to a supplemental code origin determination module 110 and to a hints storage 122.

Supplemental code origin determination module 110 will determine a developer of the supplemental code module that was a probable cause of the crash of the application 126. The application origin determination module 112 will determine whether the source of the application 126 is the same as either the source of the OS 104 or the source of the application 126.

Additionally, in some implementations, an application 126 may be particularly configured for use in embodiments as described herein, and to be "aware" of the crash cause identification capability. In such embodiments, hints storage 122, also connected to the probable crash cause decision module 114, may provide one or more hints to aid the probable crash cause decision module 114 in determining the source of a supplemental code module determined to be a cause of a crash, relative to the sources of the OS 104 and the application 126. Such a hint may include a descriptive name for the determined supplemental code module. Hints storage 112 may also provide a hint such as source-related information provided by the hint module 137 of the supplemental code loading module 136 upon loading of supplemental code (e.g., supplemental code A 138).

The crash reporting application 106 includes a crash reporting application API 120, providing an interface to the application 126 and the application library 142. Such crash reporting application API 120 will typically be used by an application provided with functionality to be "aware" of the crash identification capability as described herein in reference to crash reporting application 106. Again, in some embodiments in which an application 126 and/or application library 142 are "aware" of the crash identification functionality, the crash reporting application API 120 provides a path for querying the crash information data store 118 upon an execution of the application 126 to determine whether the application 126 crashed previously. Lastly, the crash reporting application 106 also includes a supplemental code hints API 124, providing an interface to the hint module 137 of the code loading module 136 and the hint module 153 of the supplemental code loading module 152 to establish an interface by which to provide hints about supplemental code modules that are loaded, as described earlier herein.

Now further with reference to the application 126 in FIG. 1, upon execution of the application 126 within the OS 104, the crash determination module 128 determines whether the application 126 has previously crashed. The crash determination module is connected to the restart history data store 132 and may query the crash information data store 118 via the crash reporting application API 120. For example, upon execution of the application 126, the crash determination module 128 may query the crash information data store 118 to determine the date and time that the application 126 crashed previously; and may query the restart history data store 132 to determine the date and time of the previous execution of the application 126. The crash determination module 128 may then compare the dates/times to determine whether the crash occurred after the previous execution of the application.

The crash determination module 128 is further connected to a response determination module 130 adapted to determine a response to the cause of a crash of the application 126 via the presentation module 134. It is possible that a response may be made automatically by the response determination module 130. However, in some implementations, the presentation module 134 will present the cause of the crash (e.g., a supplemental code module name causing the crash) and query the user as to an action to be taken, if any. For example, the user may be presented with a user interface and queried whether the user would like: to (1) load the offending supplemental code module, (2) to disable the supplemental code module from loading for this execution of the application 126, or (3) to uninstall the supplemental code module to prevent it from ever loading into the application 126. The response determination module 130 is also connected to the supplemental code loading module 136. Therefore, based on user selection, the supplemental code loading module 136 may load, disable or uninstall the offending supplemental code module (e.g., supplemental code module A 138) which has caused the application 126 to crash. If the crash determination module 128 determines that there was no prior crash of the application, or that a crash did not occur after the prior execution time and date of the application 126, or the response determination module 130 determines to load the offending supplemental code module, the supplemental code loading module 136 may load the supplemental code modules (including the offending supplemental code module) in a normal fashion.

Lastly with reference to FIG. 1, it is noted that the application library 142, which may be linked to the application 126, may also load supplemental code, e.g., supplemental code B 154. Components 144-153 of the application library 142 correspond to similarly-named components 128-137 of the application 126. Consequently, these components will not be described in detail herein; instead the description of components 128-137 is referred to for a description of the relative functionality of component 144-153.

Figure 2:
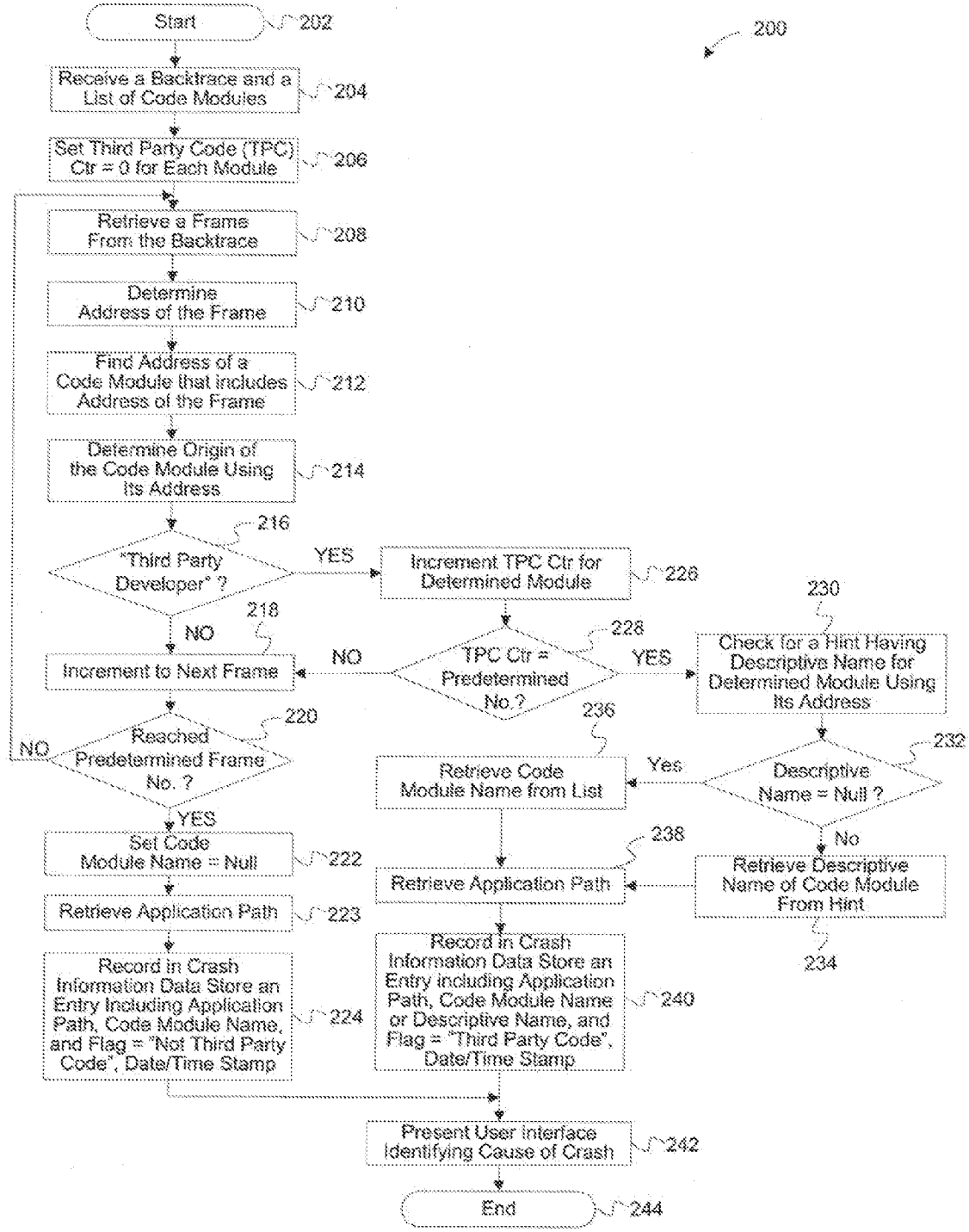
FIG. 2 is a flowchart illustrating an example method executed by the probable crash cause decision module for determining a probable cause of a crash of the application in accordance with FIG. 1.

FIG. 2 is a flowchart illustrating an example method 200 that may be executed by the probable crash cause decision module 114 for determining a probable cause of a crash of the application 126 in accordance with FIG. 1. In overview, the method 200 depicted in FIG. 2, will start once a crash has been detected by the system, such as by the OS 104, and the notification is sent (in reference to FIG. 1) to the crash detection module 108. As will be seen from the following description, the method 200 performs several actions: it receives a backtrace and list of associated code modules, and determines if any of those code modules are from a third party (i.e., a source other than the source(s) of the OS 104 and application 126). Also, it determines if an identified third-party-sourced code module was a likely cause of the crash. In making the determination of the source of a code module, hints provided by an enabled application 126 or library 142 may be used to specify more precisely the identified third party code module.

The depicted method 200 starts at operation 202 upon being invoked by the crash detection module 108 after receiving notification that the application 126 has crashed. At operation 204, a backtrace and a list of code modules is received from the crash detection module 108. The list of code modules and the backtrace may be provided in a crash report (e.g., crash report 1300 in FIG. 13) generated by the crash detection module 108 after a crash of an application 126, or may be provided in any other fashion, such as by using data structures or objects that include the code module and the backtrace. At operation 206, a third party code (TPC) counter is initialized to zero for each code module in the list. A frame is retrieved from the backtrace at operation 208 and at operation 210 an address associated with the frame is determined. At operation 212, the address of the frame is used to find a start address of a code module in the list of code modules that includes the address of the frame in an address range of the code module (e.g., from a start address to an end address). At operation 214, an origin of the code module is determined using the start address. More particularly, operation 214 is performed by supplemental code origin determination module 110, which is described with reference to the flowchart 300 in FIG. 3 later herein. At this point it is sufficient to describe that operation 214 sets a code module origin flag for the code module, which identifies whether the code module was provided by a developer of the OS 104, by a developer of the application 126 or by a third party developer (e.g., not the OS developer or the application developer). It is noted that any sort of flag may be used for this purpose (e.g., numeric flag, string flag, or any other flag).

Further with reference to FIG. 2, at operation 216 it is determined whether the code module origin flag from operation 214 is set to identify a third party developer. If it is determined that the code module is not by a third party developer, the method 200 continues at operation 218 in which the method increments to a next frame in the backtrace. At operation 220, it is further determined whether a predetermined frame number was reached. More specifically, the predetermined frame number depends on a particular implementation and may be represent any predetermined number of frames (e.g., 10 frames), which may be in the backtrace provide by the crash detection module 108. If the predetermined number has not been reached at operation 220, the method 200 continues at operation 208 in which a next frame from the backtrace is retrieved. Alternatively, if the predetermined number has been reached at operation 220, the method 200 continues at operation 222 in which name of the code module is set to null. At operation 223 a path of the application 126 is retrieved. The path may be retrieved from the crash report (e.g., crash report 1300 in FIG. 13) generated by the crash detection module 108. Thereafter, at operation 224 an entry is recorded in the crash information data store 118, including the path of the application 126, the code module name (null), a code module origin flag of "Not Third Party Code," and a date/time stamp. At operation 242, a user interface is presented to a user identifying the cause of the crash of the application 126. More specifically, as the cause of the crash was caused either by the developer of the OS 104 or by the developer of the application 126, the user interface may present to the user that the application quit unexpectedly and may further direct the user to contact the developer of the OS or of the application for further assistance. An example user interface will be described hereinafter in reference to FIG. 5B.

Now further with reference to operation 216 of FIG. 2, if it is determined that the code module is by a third party developer, the method 200 continues at operation 226, in which the third party code (TPC) counter is incremented for the module determined at operation 212. At operation 228, it is further determined whether the TPC counter has reached a predetermined number. The predetermined number depends upon a particular implementation, but may be one or greater (e.g., one, three, and the like), but less than or equal to the predetermined number in operation 220. If it is determined at operation 228, that TPC counter for the module does not equal the predetermined number, the method 200 continues at operation 218 in which the method 200 increments to a next frame.

Alternatively, if the TPC counter for the module is equivalent to the predetermined number, the method 200 continues at step 230 in which a hint is checked in hints storage 122 for a descriptive name of the determined code module using its address. An example hint will be described in greater detail hereinafter in reference to FIG. 10. As noted in reference to FIG. 1, the availability of such hints will, in most embodiments, be dependent upon the application in questions having been enabled to be "aware" of crash identification functionality of the crash reporting application 106; though many embodiments may be practiced without such application "awareness."

At operation 232, it is determined whether the descriptive name is null. If descriptive name is determined to be null, the method 200 continues at operation 236 in which the name of the code module is retrieved from the list of code modules. If the descriptive name is not null, the method 200 continues at operation 234 in which the descriptive name of the code module is retrieved from the hint. In either case, the method 200 continues at operation 238 in which the path of the application 126 is retrieved. The path may be retrieved from the crash report (e.g., crash report 1300 in FIG. 13) generated by the crash detection module 108. At operation 240, an entry is recorded in the crash information data store 118, including the path of the application 126, the code module name (from operation 236) or a descriptive name (from operation 234), a code module origin flag of "Third Party Code," and a date/time stamp. Finally, at operation 242, a user interface is presented to a user identifying the cause of the crash of the application 126. More specifically, a supplemental code module having code module name or descriptive name is identified as the cause of the crash of the application 126 in operation 242. An example user interface will be described hereinafter with reference to FIG. 5A.

Figure 3:
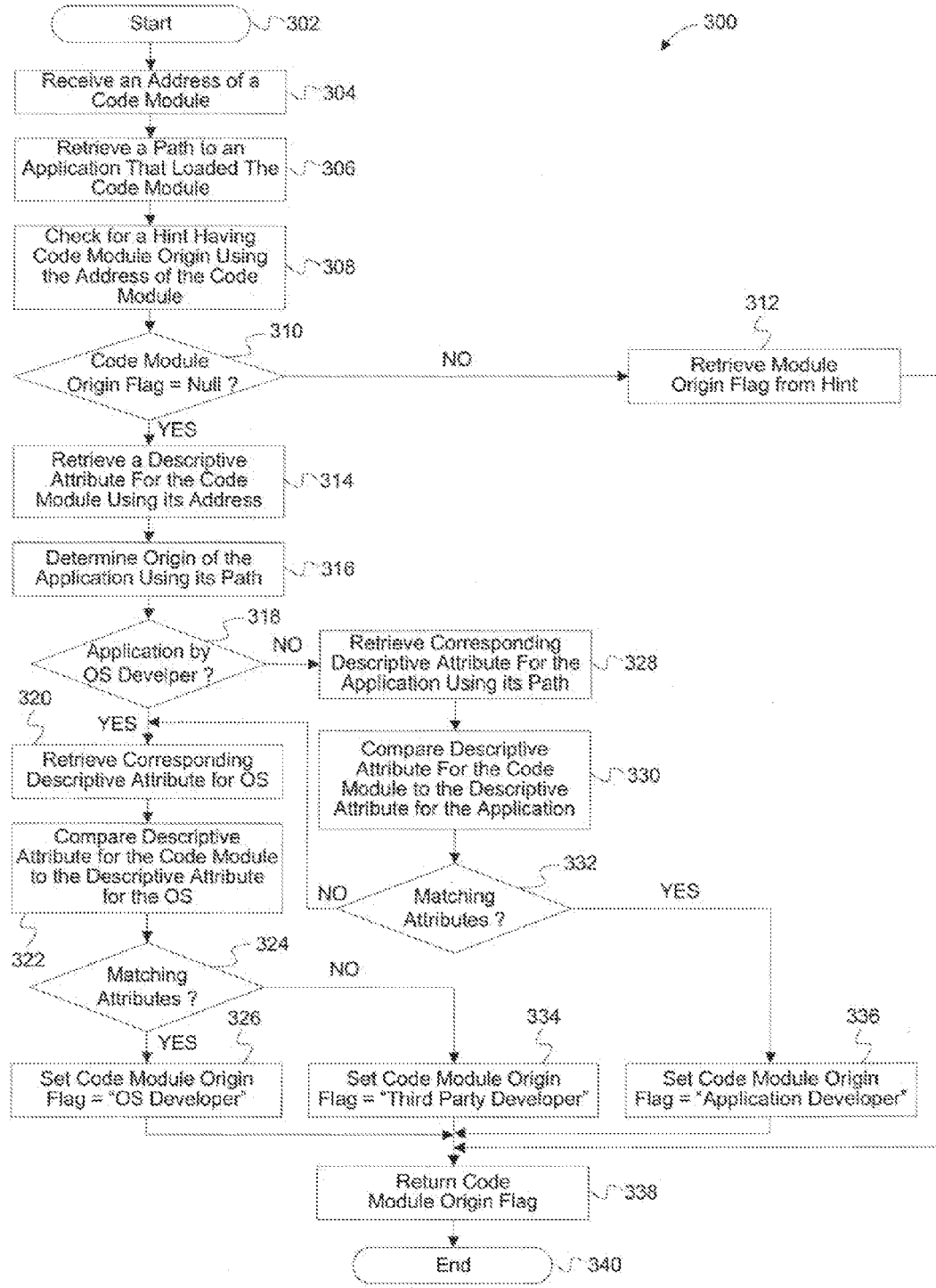
FIG. 3 is a flowchart illustrating an example method executed by the supplemental code origin determination module to determine the origin of supplemental code in accordance with FIG. 1.

FIG. 3 is a flowchart illustrating an example method 214 executed by the supplemental code origin determination module 110 to determine the origin of a supplemental code module in accordance with FIG. 1. The method starts at operation 302. At operation 304, an address of a code module is received (e.g., a start address of the code module). The address is received from the probable crash cause decision module 114 (from operation 214 in FIG. 2). A path to the application that loaded the code module is retrieved at operation 306. The path may be retrieved from the crash report (e.g., crash report 1300 in FIG. 13) generated by the crash detection module 108 after a crash of an application 126, or may be provided in any other fashion, such as by querying OS 104 to obtain the path to the crashed application. At operation 308, it is checked whether there is a hint in hint storage 122 having a code module origin flag using the address of the code module received at operation 304. At operation 310, it is determined whether the code module origin flag is null. If it is determined that the code module origin flag is not null, the method 300 continues at operation 312 in which the code module origin flag is retrieved from the hint. Thereafter, at operation 338, the retrieved code module origin flag is returned to operation 214 of method 200 described in reference to FIG. 2.

Further with reference to FIG. 3, if at operation 310 it is determined that the code module origin flag is null, the method 300 continues at operation 314 in which a descriptive attribute for the code module is retrieved using the address of the code module. A descriptive attribute may be retrieved by any of several measures as may be contemplated by those of skill in the art, for example: (a) by querying the OS 104 using the address of the code module, (b) by examining structures stored in memory within the code module's address range, (c) by querying the OS 104 for a path from which the code module was loaded and reading a descriptive attribute from resources associated with the path from which the code module was loaded, or (d) using the path from which the code module was loaded as a descriptive attribute. A descriptive attribute may be one or more of many types of attributes, including, for example: a cryptographic signature or a hash code, a developer string or numeric code, a globally unique identification (GUID), a copyright string, a recognizable symbolic name for a memory address or a function within the code module, as well as any other descriptive attribute that describes the code module. At operation 316, the origin of the application is determined using its path. Operation 316 is performed by the application origin determination module 112, the method of which is described in flowchart 400 of FIG. 4, and which returns an application origin flag. The application origin flag returned may be set to "OS developer" or "Application Developer." At operation 318, it is determined whether the application is by an "OS developer," and if so, at operation 320, a descriptive attribute corresponding to descriptive attribute for the code module is retrieved for the OS 104. This may be accomplished by a call to the OS 104. The descriptive attribute for the code module is compared to the descriptive attribute for the OS 104. At operation 324, it is determined whether the attributes match. If there is a match of the attributes, then at operation 326, the code module origin flag is set to "OS Developer." If at operation 324, there is no match then at operation 334, the code module origin flag is set to "Third Party Developer."

Yet further with reference to FIG. 3, and now referring back to operation 318, if it is determined that the application is not by "OS Developer," the method 300 continues at operation 328 in which a corresponding descriptive attribute is retrieved for the application 126 using its path. The descriptive attribute may be retrieved by querying the OS 104 using the path of the application 126, by examining data structures stored within the application's memory, by querying the OS 104 for the path from which the application was loaded and then reading the attribute from resources associated with the path from which the application was loaded. At operation 330, the descriptive attribute for the code module is compared to the descriptive attribute for the application. At operation 332, it is determined whether the descriptive attributes match. If there is a match of the attributes, then at operation 336, the code module origin flag is set to "Application Developer." Alternatively, if there is no match at operation 332, then the method continues at operation 320 in which a descriptive attribute corresponding to the descriptive attribute for the code module is retrieved for the OS 104. Once the code module origin flag has been set at operations 326, 334 and 336, or provided from operation 312, method 200 continues at operation 338 in which the code module origin flag is returned. The method ends at operation 340.

Figure 4:
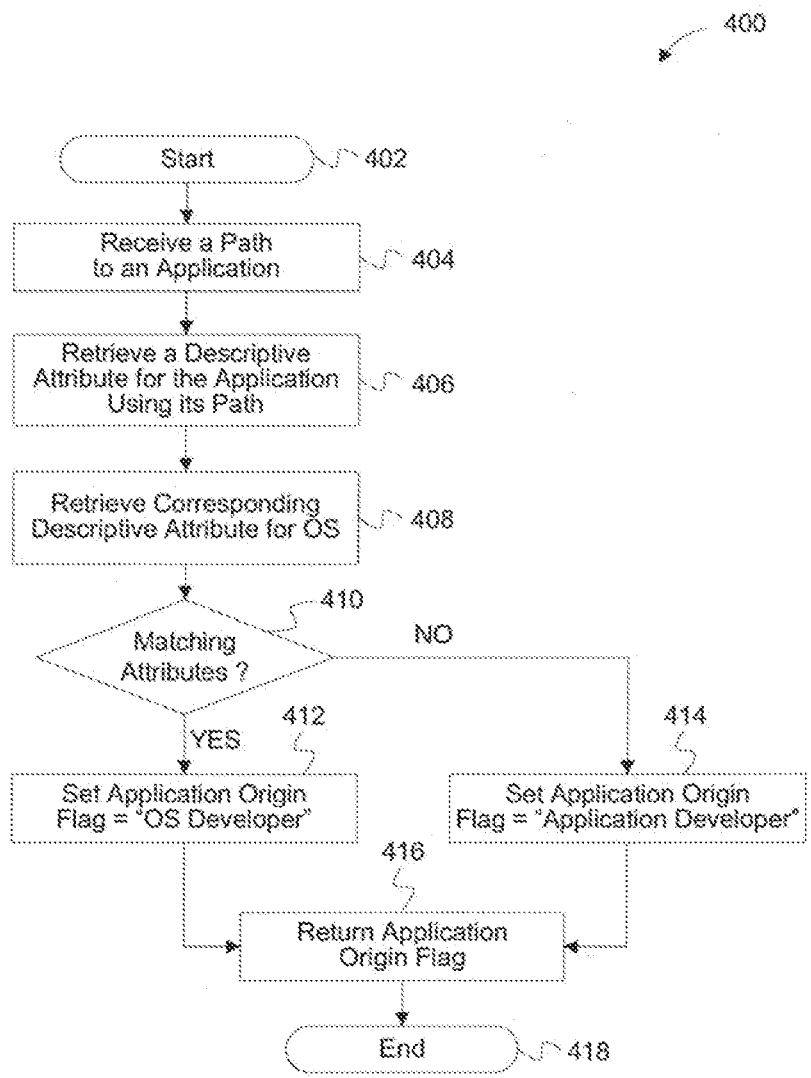
FIG. 4 is a flowchart illustrating an example method executed by the application origin determination module to determine the origin of the application in accordance with FIG. 1.

FIG. 4 is a flowchart illustrating an example method 400 executed by the application origin determination module 112 to determine the origin of the application 126 in accordance with FIG. 1. The method 400 started at operation 402. At operation 404, the method 400 receives a path to an application (e.g., application 126) from operation 316 of FIG. 3. A descriptive attribute is retrieved for the application 126 using its path at operation 406. The retrieval of the descriptive attribute was described hereinabove with reference to FIG. 3 and is referenced in this description. As described hereinbefore with reference to FIG. 3, a descriptive attribute may be one of the many types indicated previously, and also may include the path from which the application was loaded, as well as any other descriptive attribute that describes the application 126. A corresponding descriptive attribute is retrieved for the OS 104 at operation 408. At operation 410, it is determined whether the attributes match. If there is a match, then an application origin flag is set to "OS Developer" at operation 412, and if there is no match then application origin flag is set to "Application Developer" at operation 416. At operation 416, the application origin flag is returned to operation 316 of FIG. 3. The method 400 ends at operation 418.

Figure 5A:
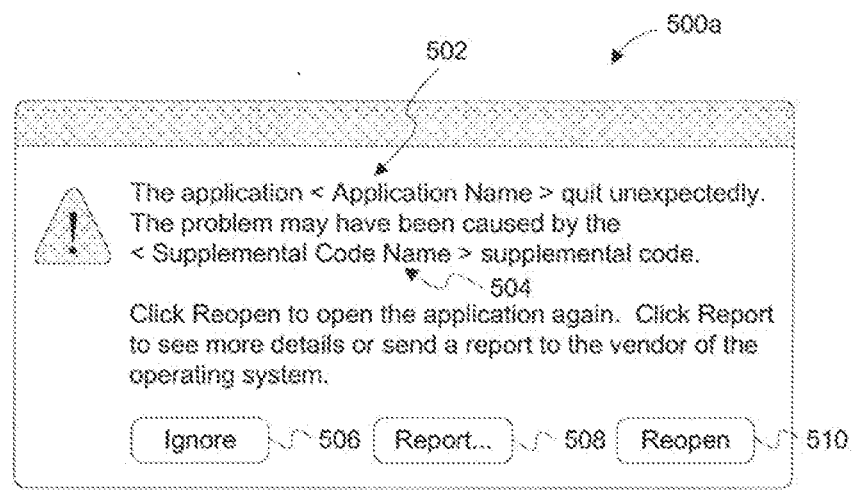
FIG. 5A is an example user interface presented to a user identifying supplemental code authored by a third party as a probable cause of a crash of the application in accordance with FIG. 1.

FIG. 5A is an example user interface 500a presented to a user identifying supplemental code 504 authored by a third party as a probable cause of a crash of the application 502 in accordance with FIG. 1. More specifically, the input to the user interface 500a is generated by probable crash cause decision module 114 of FIG. 1 using the method of FIG. 2 and presented to the user by presentation module 116 of FIG. 1. The user interface 500 further allows the user to ignore the crash by clicking button 506, to report the crash of the application to the OS developer 502, or to reopen the application again 510.

Figure 5B:
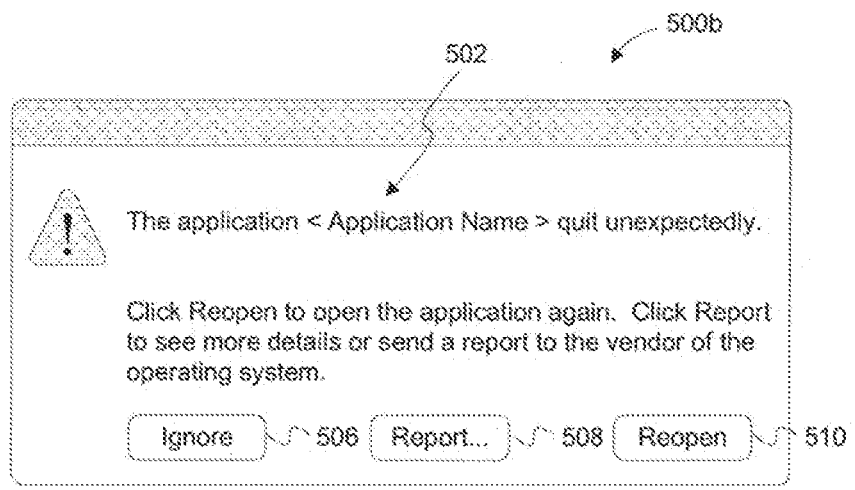
FIG. 5B is an example user interface presented to a user identifying a crash of the application when supplemental code is not authored by a third party in accordance with FIG. 1.

FIG. 5B is an example user interface 500b presented to a user identifying a crash of the application when the probable cause of the crash was not due to supplemental code authored by a third party in accordance with FIG. 1. More specifically, the supplemental code is authored by either the OS developer of OS 104 or the application developer of application 126. Consequently, user interface 500b reports to the user that the application 502 crashed and does not identify the supplemental code that caused the crash, as the application name 502 provides sufficient information as to the cause of the crash. As with user interface 500a, the input to the user interface 500b is generated by probable crash cause decision module 114 of FIG. 1 using the method of FIG. 2 and presented to the user by presentation module 116 of FIG. 1.

Figure 6:
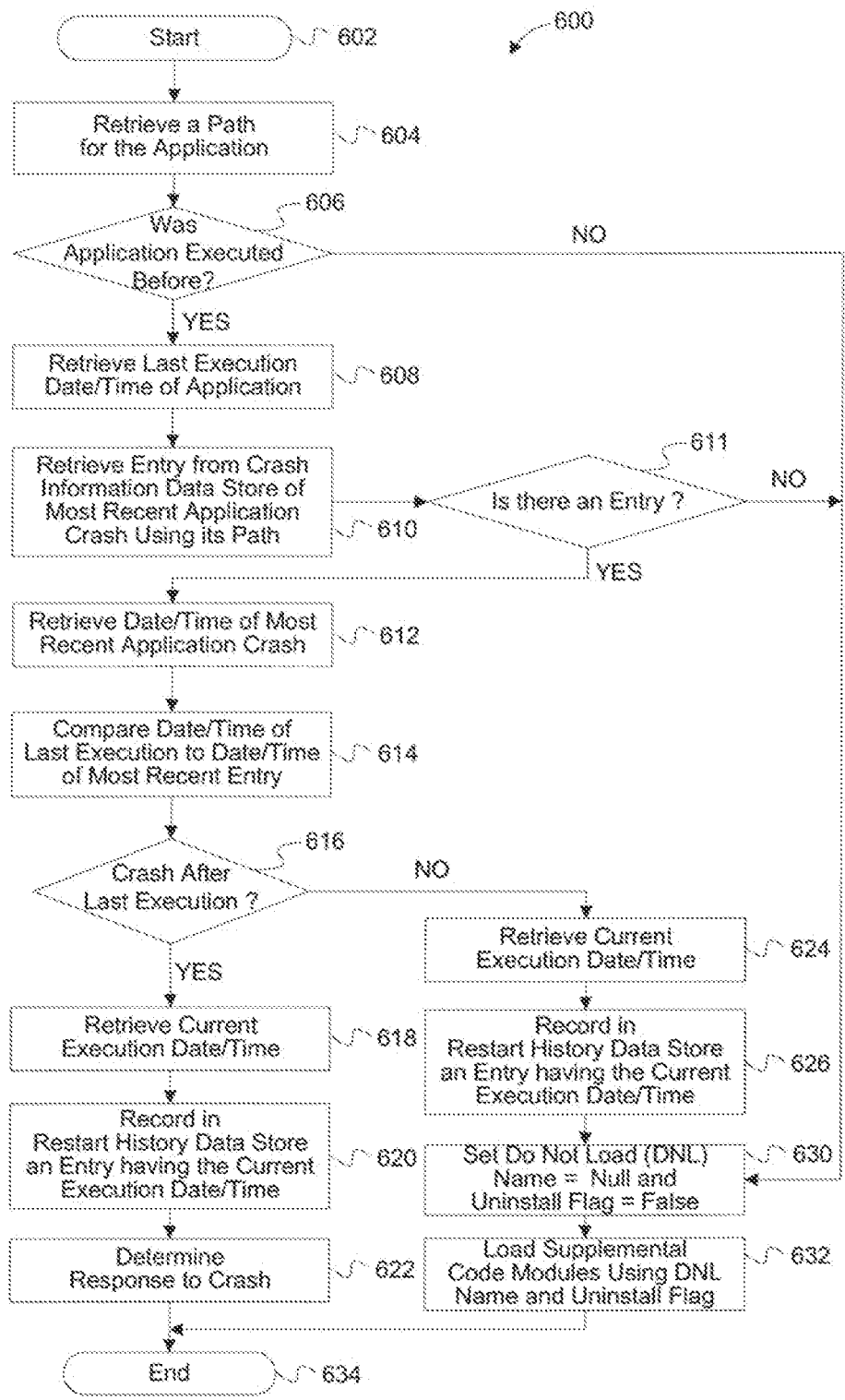
FIG. 6 is a flowchart illustrating an example method executed by the crash determination module for determining whether the application has previously crashed in accordance with FIG. 1.

FIG. 6 is a flowchart illustrating an example method 600 executed by the crash determination module 128 of the application 126 for determining whether the application 126 has previously crashed in accordance with FIG. 1. The method 600 starts at operation 602. At operation 604, a path is retrieved for the application 126. The retrieval may be accomplished by querying the OS 104 for the path from which the current application was loaded, or may be passed by the OS 104 to a main execution entry point for the application 126. At operation 606 it is determined whether the application 126 was executed before. This is accomplished by determining whether there is an entry in the restart history data store 132. If the application was not previously executed (e.g., application is being executed for the first time), the method 600 continues at operation 630 in which a do not load (DNL) flag is set to null and uninstall flag is set to false (both flags will be used with respect to FIGS. 7-8 herein below). At operation 632 supplemental code modules are loaded using the DNL flag and uninstall flag. The loading of supplemental code modules will be described with reference to flowchart 800 in FIG. 8 herein below.

Figure 11:
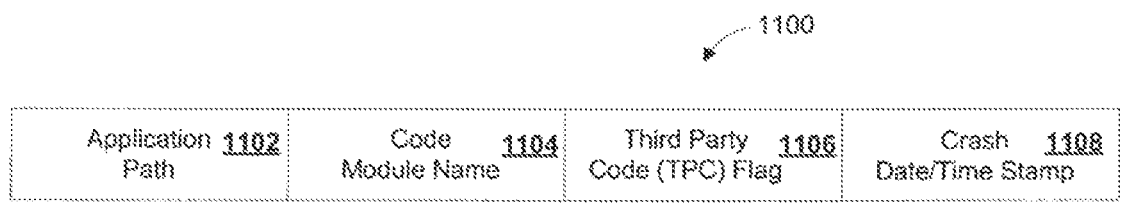
FIG. 11 is an example entry in a crash information data store identifying a probable cause of an application crash in accordance with FIG. 1.
Figure 12:
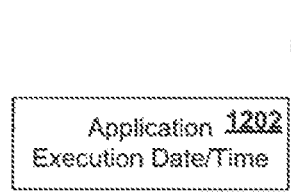
FIG. 12 is an entry in a restart history data store of an application identifying a previous execution date and time of the application in accordance with FIG. 1.

Now referring back to operation 606 of FIG. 6, if the application 126 was loaded before, at operation 608 the last date and time of the execution is retrieved from the restart history data store 132. A sample entry 1200 in restart history data store 132 is illustrated in FIG. 12 herein below. At operation 610, an entry is retrieved from crash information data store 118 of the most recent application crash using the application's path. An entry 1100 in the crash information data store 118 is illustrated in FIG. 11. At operation 611 it is determined whether there was an entry retrieved. If an entry was not retrieved, the method 600 continues at operation 630. Alternatively, if an entry was retrieved, the method 600 continues at operation 612 in which the date and time of the most recent crash of the application 126 are retrieved from the entry from crash information data store 118. The date and time of the last execution of the application 126 are compared to the date and time of the last crash of the application 126. At operation 616, it is determined whether the crash of the application occurred after the last execution of the application. If the application crashed after its last execution, at operation 618, the current date and time are retrieved. This may be accomplished by a call to the OS 104 or in any other fashion. At operation 620, an entry having the current date and time is recorded in the restart history data store 132. At operation 622 the response to the crash is determined. The determination of the response to the crash is described with reference to method 700 in FIG. 7 herein below.

Now referring back to operation 616 of FIG. 6, if the crash of the application 126 did not occur after the last execution of the application 126, the method 600 continues at operation 624 in which the current date and time are retrieved. At operation 626, an entry having the current date and time is recorded in the restart history data store 132. As already described above, a do not load (DNL) flag is set to null and uninstall flag is set to false at operation 630. At operation 632, supplemental code modules are loaded using the DNL flag and uninstall flag. The loading of supplemental code modules will be described with reference to flowchart 800 in FIG. 8 herein below.

Figure 7:
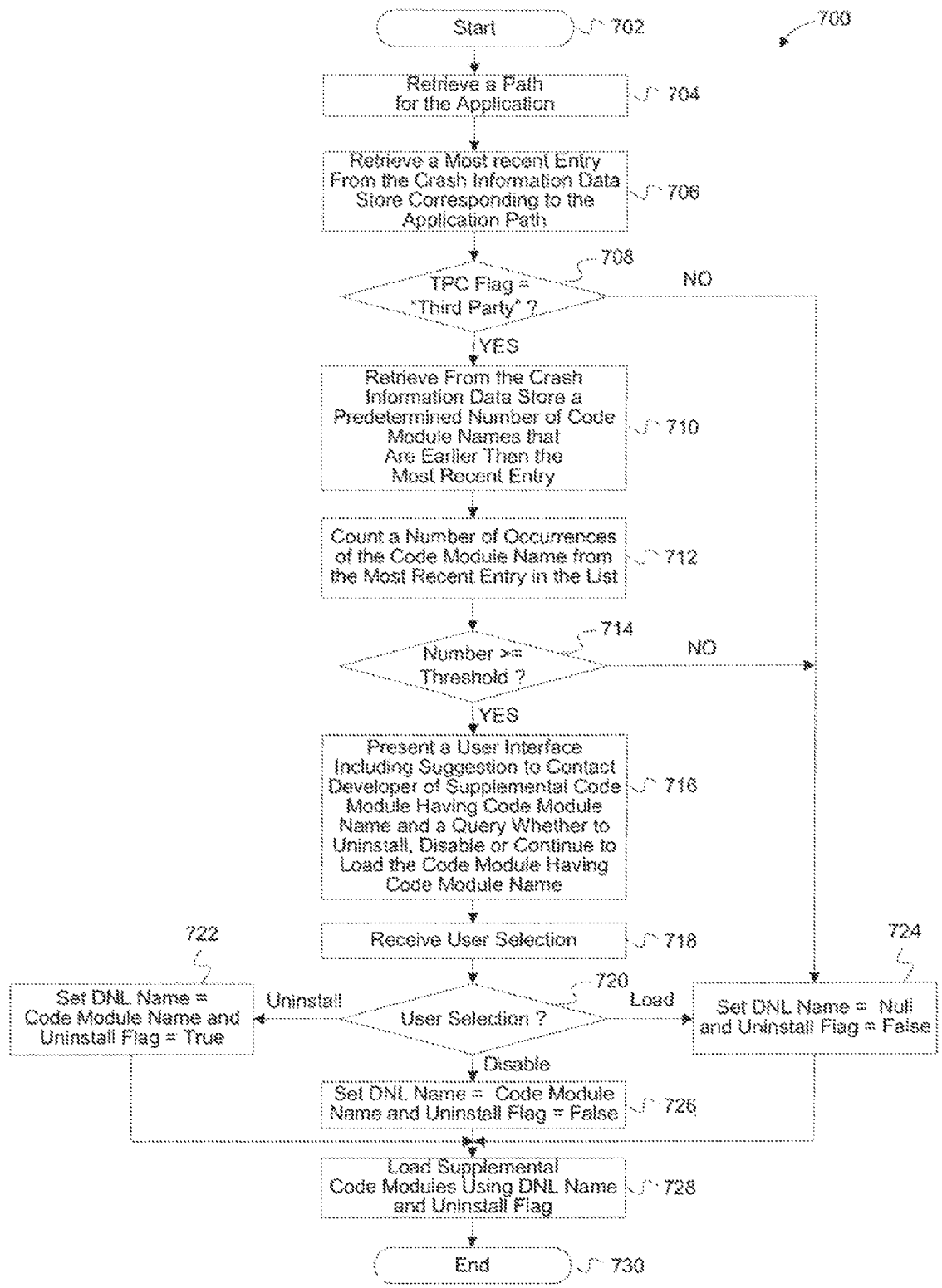
FIG. 7 is a flowchart illustrating an example method executed by the response determination module for determining a response to the cause of a crash of the application in accordance with FIG. 1.

FIG. 7 is a flowchart illustrating an example method 700 executed by the response determination module 130 for determining a response to the cause of a crash of the application 126 in accordance with FIG. 1. The method 700 starts at operation 702. At operation 704, a path for the application is retrieved. As already described hereinabove, the retrieval may be accomplished by querying the OS 104 for the path from which the application was loaded. At operation 706, a most recent entry corresponding to the application path is retrieved from the crash information data store 118. An example entry 1100 in the crash information data store 118 is illustrated in FIG. 11 herein below. At operation 708, it is determined whether the third party code (TPC) flag in the retrieved entry is set to "Third Party." It is again noted that any sort of flag may be used for this purpose (e.g., numeric flag, string flag, or any other flag). If it is determined that the TPC flag is set to "Third Party," the method 700 continues at operation 710 in which a predetermined number of code module names that are earlier than the most recent entry are retrieved from the crash information data store 118. The predetermined number of code module names retrieved varies with implementation. More specifically, if it is desired to alert the user the very first time a code module causes the application to crash, a number of 1 may be used. Alternatively, if it is desired to wait until a pattern of crashes is established, a higher number may be used. At operation 712, the number of occurrences of the code module name from the most recent entry is counted in the predetermined number of retrieved code module names. At operation 714, it is determine whether the number of occurrences of the code module name from the most recent entry is greater or equal to a predetermined threshold. The threshold may vary with implementation, and may be set to 1 or a higher number, if establishing a pattern is desired. If the number of occurrences is not greater than or equal to the predetermined threshold, the method 700 continues at operation 724 in which the do not load (DNL) flag is set to null and the uninstall flag is set to false. Thereafter the method continues at operation 728 at which supplemental code modules are loaded using the DNL flag and uninstall flag. The loading of supplemental code modules will be described with reference to flowchart 800 in FIG. 8 herein below.

Now referring back to operation 714 of FIG. 7, if the number of occurrences of the code module name from the most recent entry is greater or equal to the predetermined threshold, the method 700 continues at operation 716 in which a user interface is presented to a user including a suggestion to contact the developer of the supplemental code module having the code module name. Additionally, as described previously, a query may be presented to the user as to whether the user would like to take one or more possible actions relative to the identified code module. These actions may include uninstalling, disabling or loading the code module having the code module name. An example user interface will be described hereinafter in reference to FIG. 9. User selection is received in response to the presented query at operation 718. At operation 720, the user selection is determined. More specifically, if the user selection is to uninstall the code module, the method 700 continues at operation 722 in which the DNL name is set to the code module name and the uninstall flag is set to true. If the user selection is to disable the code module, the method 700 continues at operation 726 in which the DNL name is set to the code module name and the uninstall flag is set to false. If the user selection is to load the code module, the method 700 continues at operation 724 in which the DNL name is set to null and the uninstall flag is set to false. From any of the operations 722, 724 or 726, the method continues at operation 728 at which supplemental code modules are loaded using the DNL flag and uninstall flag. Thereafter, the method 700 ends at operation 730.

Figure 8:
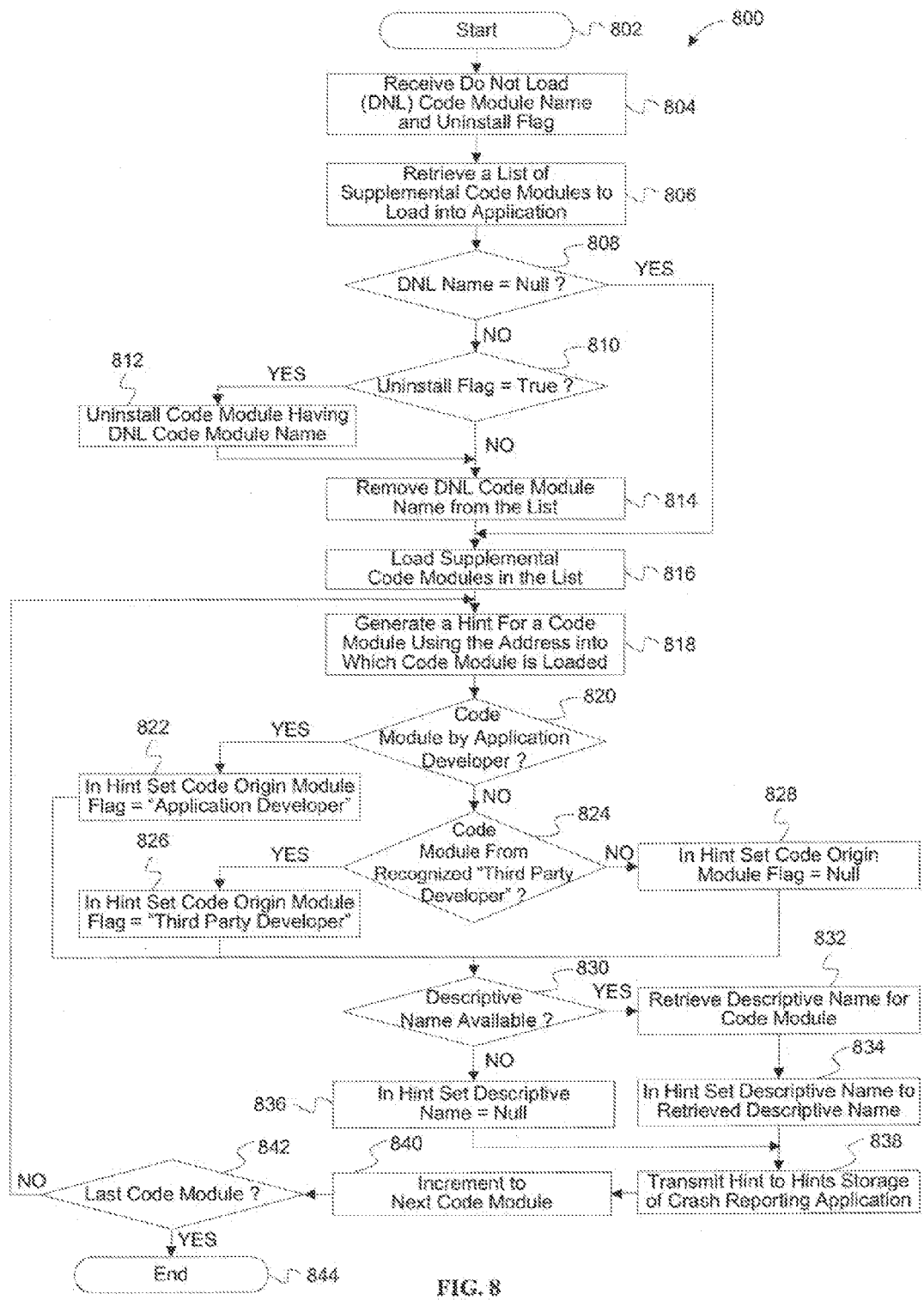
FIG. 8 is a flowchart illustrating an example method executed by the supplemental code loading module for loading supplemental code modules according to the response to the cause of a crash of the application and providing hints as to loaded modules in accordance with FIG. 1.

FIG. 8 is a flowchart illustrating an example method 800 executed by the supplemental code loading module 136 for loading supplemental code modules according to the response to the cause of a crash of the application and providing hints as to loaded modules in accordance with FIG. 1. More specifically, the method 800 starts at operation 802. At operation 804, a do not load (DNL) code module name and an uninstall flag are received. At operation 806, a list of supplemental code modules to load into the application 126 is retrieved. The list may be retrieved by searching for code modules in one or more predetermined directories (paths) which conform to a supplemental code module specification, or by other methods provided by the developers of the application 126. At operation 808, it is determined whether the DNL name equals null. If the DNL code module name is null, the method continues at operation 816. However, if DNL code module name is not null, the method continues at operation 810 at which it is determined whether the uninstall flag equals true. If the uninstall flag is true, then at operation 812, the code module having the DNL code module name is uninstalled. The code module may be uninstalled by deleting the code module's files or moving the files to a directory (path) that the application does not search to load the code module. If the uninstall flag is false, then at operation 814, the DNL code module name is removed from the list of supplemental code modules to load into the application 126.

Further with reference to FIG. 8, at operation 816, the supplemental code modules in the list are loaded into the application 126. At operation 818, a hint is generated for a supplemental code module in the list (a first code module) using the address into which the code module was loaded. At operation 820, it is determined whether the supplemental code module was produced by the developer of the application 126. The developer information may be obtained from the application 126 or the supplemental code module may be queried and may return this information. More specifically, developer information may be obtained using APIs that are part of an interface specification particular to the application 126 and the supplemental code module, or by comparing a name or a path of the supplemental code module being loaded to a predetermined list of supplemental code modules provided by the application 126. If the supplemental code module is produced by the application developer, then at operation 822, the code origin module flag is set to "Application Developer" in the hint generated at operation 818. If the supplemental code module is not produced by the application developer, then at operation 824, it is further determined whether the supplemental code module is from a recognized "Third Party Developer." The third party developer may be recognized by using supplemental code APIs that are part of an interface specification particular to the application 126 and the supplemental code module, or by comparing a name or path of the supplemental code module being loaded to a predetermined list of common third party supplemental code modules provided by the application 126. If the supplemental code module is from a recognized third party developer, then at operation 826, the code origin module flag is set to "Third Party Developer" in the hint generated at operation 818. If the supplemental code module is not from a recognized third party developer, then at operation 828, the code origin module flag is set to null in the hint generated at operation 818.

Still further with reference to FIG. 8, from any of the operations 826 and 828, the method 800 continues at operation 830 at which it is determined whether a descriptive name is available for the supplemental code module. The descriptive name may be predefined in the application 126 for the supplemental code module or the supplemental code module may be queried to obtain a descriptive name using APIs that are part of an interface specification particular to this application and its supplemental code module. If the descriptive name is not available, at operation 836 the descriptive name of supplemental code module in the hint is set to null. Alternatively, if the descriptive name is available, the descriptive name of supplemental code module is retrieved at operation 832, and at operation 834 the descriptive name of supplemental code module in the hint is set to the retrieved descriptive name. Thereafter, from any of the operations 834 and 836, the method 800 continues at operation 838 at which the hint is transmitted to hints storage 122 of the crash reporting application 106 for storage and later use by the modules 110 and 114 of the crash reporting application 106. At operation 840 the method 800 increments to the next supplemental code module in the list of supplemental code modules. At operation 842 it is further determined whether it was the last supplemental code module. If the last supplemental code module in the list of supplemental code modules was processed, then the method 800 ends at operation 844. Alternatively, if there is a next supplemental code module in the list, the method 800 continues at operation 818 to process that supplemental code module in order to generate a hint.

Figure 9:
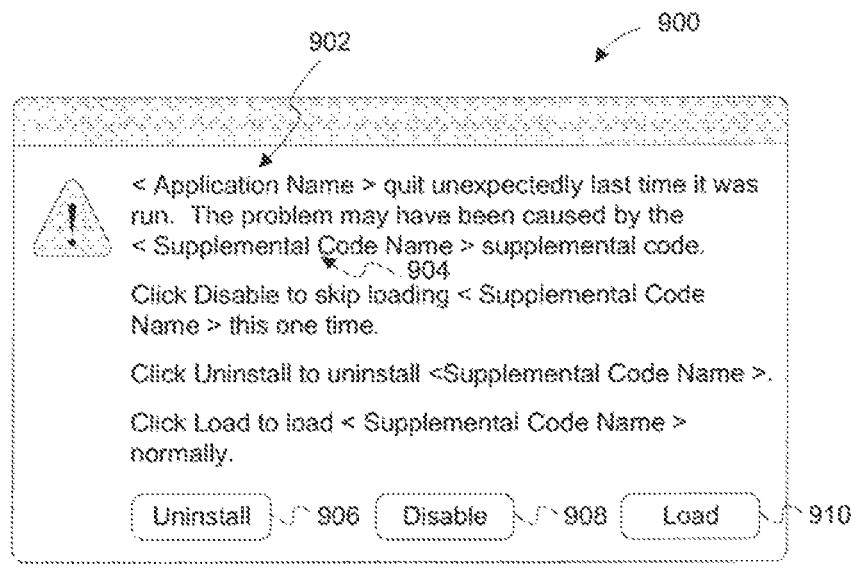
FIG. 9 is an example user interface presented to a user identifying supplemental code authored by a third party as a probable cause of a crash of the application and querying the user as to an action the user may make in response to the crash of the application in accordance with FIG. 1.

FIG. 9 is an example user interface 900 presented to a user identifying supplemental code authored by a third party 904 (e.g., supplemental code 138) as a probable cause of a crash of the application 902 (e.g., application 126) and querying the user as to an action the user may make in response to the crash of the application 902 in accordance with FIG. 1. The input to the user interface 900 is generated by crash determination module 128 of FIG. 1 using the method of FIG. 7 and presented to the user by presentation module 134 of FIG. 1. The user interface 900 allows the user to uninstall the offending supplemental code module 904 by clicking button 906, to disable the offending supplemental code module 908, or to load the offending supplemental code module 910.

Figure 10:
FIG. 10 is an example entry in a hints storage that stores descriptive information to facilitate the identification of supplemental code more accurately.

FIG. 10 is an example entry 1000 in a hints storage 122 that stores descriptive information to facilitate the identification of supplemental code more accurately. The entry 1000 in the hints storage 122 includes an address of the code module 1002. This address enables both the supplemental code origin module 110 and the probable crash cause decision module 114 of the crash reporting application 106 to reference a proper entry in the hints storage 122. Furthermore, the entry 1000 includes a code module origin flag 1004 that may be retrieved by the supplemental code origin determination module 110 using the method 300 in FIG. 3. Lastly, the entry 1000 includes a descriptive name of a code module 1006 that may be retrieved by the probable crash cause decision module 114.

FIG. 11 is an example entry 1100 in a crash information data store 118 identifying a probable cause of an application crash in accordance with FIG. 1. More specifically, the entry 1100 in the crash information data store 118 includes an application path to reference a proper entry in the crash information data store 118. The entry 1100 also includes a code module name 1104 of the offending supplemental code module that was determined to have caused the crash of the application identified by its application path 1102. The entry 1100 further includes a third party code (TPC) flag 1106 that identifies whether the offending code module represented by code module name 1104 was generated by a "Third Party Developer." Lastly, the entry 1100 includes crash date and time stamp as to when the application at application path 1102 has crashed.

FIG. 12 is an entry 1200 in a restart history data store 132 of an application 126 identifying a previous execution date and time of the application 126 in accordance with FIG. 1. More specifically, the entry 1200 includes an application execution date and time 1202, which identifies the last date and time that the application 126 was executed.

Figure 13:
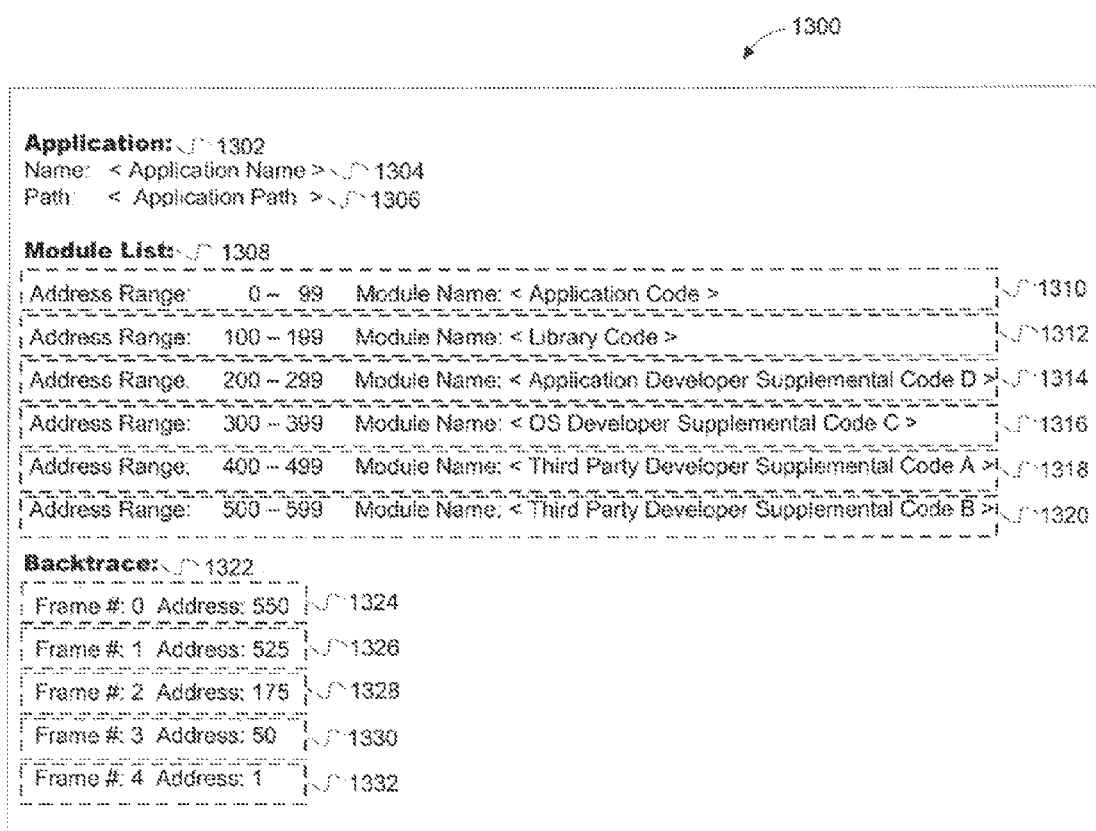
FIG. 13 is an example crash report generated by the crash detection module after a crash of an application in accordance with FIG. 1.

FIG. 13 is an example crash report 1300 generated by the crash detection module 108 after a crash of the application 126 in accordance with FIG. 1. The crash report 1300 includes an application identification section 1302, a module list section 1308 and a backtrace section 1322. The application identification section 1302 identifies the crash application 126 by a name of the application 1304 and by a complete path of the application 1306. The module list section 1308 includes entries 1310-1320 of code modules loaded by the application 126 during its execution and before its crash. Each of the entries 1310-1320 includes a module name and an address range into which the module was loaded by the application 126. For example, entry 1310 may represent application code of the application 126 loaded by the application 126 into address range 0-99. Entry 1312 may represent application library 142 code loaded by the application 126 into address range 100-199, while entry 1314 may represent supplemental code D from the developer of the application loaded by the application 126 into address range 200-199. Entry 1316 may represent supplemental code C from the developer of the OS 104 loaded by the application 126 into address range 300-399. Finally, entry 1318 may represent supplemental code A 138 from a third party developer loaded by the application 126 into address range 400-499, while entry 1320 may represent supplemental code B 154 from a third party developer loaded by the application library 142 of the application 126 into address range 500-599.

Further with reference to FIG. 13, the backtrace section 1322 includes frames 1324-1332, which represent memory addresses (or memory locations) on a call stack during execution of the application 126 and before the crash of the application 126. Generally the call stack is implemented on a last-in-first-out (LIFO) basis. That is, frame 1332 may represent an entry point to application code of the application 126 at execution of the application 126. It is noted that the address or memory location 1 is within entry 1310. As represented in frame 1330, the address or memory location of 50 is also within entry 1310 and may represent execution of a function in the application code. As represented in frame 1328, the address or memory location of 175 is within entry 1312 and may represent a function executed in the application library 142. As represented in frame 1326, the address or memory location of 525 is within entry 1320 and may represent a function executed in a third party supplemental code B 154 by the application library 142. Lastly, as represented in frame 1326, the address or memory location of 525 is within entry 1320 and may represent the address of a last instruction executed in the third party supplemental code B 154 by the application library 142. The third party supplemental code B 154 called by the application library 142 may represent the offending supplemental code module 154 that may have cause the crash of the application 126 in accordance with FIG. 1.

Figure 14:
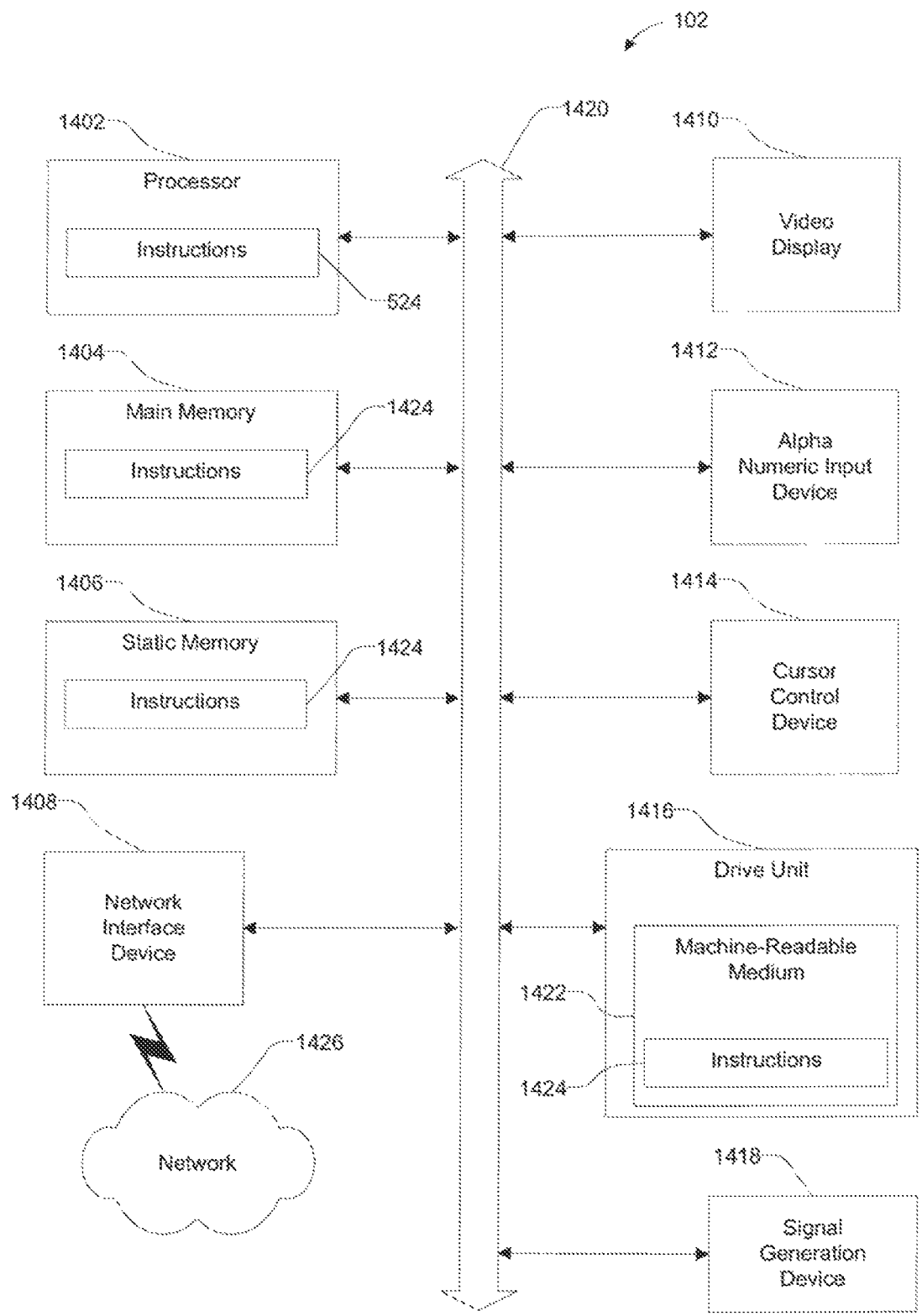
FIG. 14 is a block diagram illustrating an example computer system within which a set of instructions, for causing the computer system to perform any one or more of the methodologies disclosed in FIGS. 1-13, may be executed.

FIG. 14 is a diagrammatic representation of machine in an example form of a computer system 102 within which a set of instructions, for causing the machine to perform any one or more of the methodologies discussed herein in FIGS. 1-13, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a computer, such as workstation, desktop, notebook or handheld computer. Additionally, although the following devices may not typically have all the components of FIG. 14, example embodiment set forth herein may also be practiced on other processor-based devices, such as a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Further with reference to FIG. 14, the example computer system 102 includes a processor 1402 (e.g., a central processing unit (CPU), a graphics processing unit (GPU) or both), a main memory 1404 and a static memory 1406, which communicate with each other via a bus 1420. The computer system 102 may further include a video display unit 1410 (e.g., a liquid crystal display (LCD) or a cathode ray tube (CRT)). The computer system 500 also includes an alphanumeric input device 1412 (e.g., a keyboard), a user interface (UI) navigation device 1414 (e.g., a mouse), a disk drive unit 1416, a signal generation device 1418 (e.g., a speaker) and a network interface device 1408.

Still further with reference to FIG. 14, the disk drive unit 1416 includes a machine-readable medium 1422 on which is stored one or more sets of instructions and data structures (e.g., software 1424) embodying or utilized by any one or more of the methodologies or functions described herein. The software 1424 may also reside, completely or at least partially, within the main memory 504 and/or within the processor 1402 during execution thereof by the computer system 102, the main memory 1404 and the processor 1402 also constituting machine-readable media. The software 1424 may further be transmitted or received over a network 1426 via the network interface device 1408 utilizing any one of a number of well-known transfer protocols (e.g., HTTP).

Lastly with reference to FIG. 14, while the machine-readable medium 522 is shown in the example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of an example embodiment, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Thus, a method, a system and a machine-readable medium for mitigating repeated crashes of an application resulting from supplemental code (e.g., plug-ins) utilized by the application have been described. Although specific example embodiments have been described, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   determining, by a processor executing an application, that the application has crashed since its last execution because of execution of a third party supplemental code module;
   retrieving, by the processor, a supplemental code module name corresponding to the third party supplemental code module;
   retrieving, by the processor, a plurality of supplemental code module names corresponding to supplemental code modules that caused earlier crashes of the application;
   checking, by the processor, whether the name of the third party supplemental code module occurs a predetermined number of times in the plurality of supplemental code module names to determine a pattern of crashes caused by the third party supplemental code module; and
   selectively performing, by the processor, an action based on the checking, the action selected from the group consisting of uninstalling, disabling and loading the third party supplemental code module.

2. The method of claim 1, wherein selectively performing an action comprises:
   presenting a user interface to a user identifying the third party supplemental code module that was responsible for crashing the application;
   querying the user as to a selection of one of uninstalling, disabling and loading of the third party supplemental code module in response to the identification of the third party supplemental code module; and
   receiving the user's selection in response to the querying.

3. The method of claim 2, wherein presenting the user interface to the user identifying the third party supplemental code module comprises:
   presenting a suggestion on the user interface to contact the developer of the identified third party supplemental code module.

4. The method of claim 1, wherein the determining comprises:
   retrieving a date and time associated with the last execution of the application;
   retrieving a date and time associated with a most recent crash of the application; and
   comparing the date and time of the most recent crash to the time and date of the last execution to determine whether the application has crashed since its last execution.

5. The method of claim 1, wherein the determining comprises:
   retrieving a supplemental code module name corresponding to a supplemental code module that has caused a most recent crash of the application; and
   determining whether the supplemental code module is provided by a third party.

6. The method of claim 1, comprising:
   retrieving a current date and time associated with the execution of the application; and
   recording the current date and time for retrieval during a next execution of the application to determine whether the application crashed since its execution represented by the current date and time.

7. The method of claim 1, comprising:
   generating a hint for a supplemental code module when the supplemental code module is loaded into the application, the hint identifying a developer of the supplemental code module and a descriptive name for the supplemental code module.

8. The method of claim 1, wherein the determining comprises detecting the crash of the application during its last execution.

9. The method of claim 8, comprising deciding whether the third party supplemental code module was a cause of the crash of the application during its last execution.

10. The method of claim 9, wherein the deciding comprises:

identifying a recent frame in a plurality of frames, each of the frames representing an address of code executed by the application during its prior execution;

determining whether an address of the identified frame is within an address range of a code module in a plurality of code modules loaded by the application during the prior execution; and determining whether an origin attribute of the code module is indicative of third party origin.

11. The method of claim 10, where determining whether the origin attribute of the code module is indicative of third party origin comprises:

retrieving the descriptive attribute corresponding to an attribute type for the code module;

retrieving a descriptive attribute for each of the application and an operating system of an attribute type that corresponds to the attribute type for the descriptive attribute for the code module; and determining whether the retrieved descriptive attribute of the code module does not match the retrieved descriptive attribute of the operating system and the retrieved descriptive attribute of the application.

12. The method of claim 9, wherein the deciding comprises:

obtaining a plurality of frames, each of said frames representing an address of code executed by the application during the last execution;

determining, for each of a predetermined number of frames of the plurality of frames, whether an address of a frame is within an address range of a code module of a plurality of code modules loaded by the application during the last execution, each of said code modules having an address range associated with a respective code module;

determining whether an origin attribute of the code module is third party; and identifying a code module having the most frames within its address range and the origin attribute of third party as the cause of the crash of the application during its last execution.

13. The method of claim 9, comprising:

presenting a user interface to the user identifying the third party supplemental code module as the cause of crashing the application during its last execution and querying the user as to a selection in response to the identification of the third party supplemental code module; and receiving the user's selection in response to the querying.

14. A system for deciding whether to load one or more supplemental code modules into an application, the system comprising:

a processor;

a crash determination module including instructions embedded in a non-transitory machine readable medium for execution by the processor, the instructions, when executed, configured to cause the processor to:

determine that the application has crashed since its last execution because of execution of a third party supplemental code module;

retrieve a supplemental code module name corresponding to the third party supplemental code module;

retrieve a plurality of supplemental code module names corresponding to supplemental code modules that caused earlier crashes of the application; and check whether the name of the third party supplemental code module occurs a predetermined number of times in the plurality of supplemental code module names to determine a pattern of crashes caused by the third party supplemental code module; and a supplemental code loading module including instructions embedded in the non-transitory machine readable medium for execution by the processor, the instructions, when executed, configured to cause the processor to selectively perform an action relative to the third party supplemental code module based on the checking, the action selected from the group consisting of uninstalling, disabling and loading the third party supplemental code module.

15. The system of claim 14, further including an application presentation module that includes instructions embedded in the non-transitory machine readable medium for execution by the processor, the instructions, when executed, configured to cause the processor to:

present a user interface to a user identifying the third party supplemental code module that was responsible for crashing the application;

query the user as to a selection of one of uninstalling, disabling and loading of the third party supplemental code module in response to the identification of the third party supplemental code module; and receive the user's selection in response to the query.

16. The system of claim 15, wherein the instructions that are configured to cause the processor to present the user interface to the user identifying the third party supplemental code module include instructions that are configured to cause the processor to:

present a suggestion on the user interface to contact the developer of the identified third party supplemental code module.

17. The system of claim 14, wherein the crash determination module includes instructions that are configured to cause the processor to:

retrieve a date and time associated with the last execution of the application;

retrieve a date and time associated with a most recent crash of the application; and compare the date and time of the most recent crash to the time and date of the last execution to determine whether the application has crashed since its last execution.

18. The system of claim 14, wherein the crash determination module includes instructions that are configured to cause the processor to:

retrieve a supplemental code module name corresponding to a supplemental code module that has caused a most recent crash of the application; and determine whether the supplemental code module is provided by a third party.

19. The system of claim 14, wherein the crash determination module includes instructions that are configured to cause the processor to:

retrieve a current date and time associated with the execution of the application;

record the current date and time for retrieval during a next execution of the application to determine whether the application crashed since its execution represented by the current date and time.

20. The system of claim 14, comprising a hint module including instructions embedded in the non-transitory machine readable medium for execution by the processor, the instructions, when executed, configured to cause the processor to generate a hint for a supplemental code module when the supplemental code module is loaded into the application, the hint identifying a developer of the supplemental code module and a descriptive name for the supplemental code module.

21. The system of claim 14, further comprising a second crash detection module including instructions embedded in the non-transitory machine readable medium for execution by the processor, the instructions, when executed, configured to cause the processor to detect the crash of the application during its last execution.

22. The system of claim 21, comprising a crash cause decision module including instructions embedded in the non-transitory machine readable medium for execution by the processor, the instructions, when executed, configured to cause the processor to decide whether the third party supplemental code module was a cause of the crash of the application during its last execution.

23. The system of claim 21, wherein the crash cause decision module includes instructions that are configured to cause the processor to:
    identify a recent frame in a plurality of frames, each of the frames representing an address of code executed by the application during its last execution;
    determine whether an address of the identified frame is within an address range of a code module in a plurality of code modules loaded by the application during its last execution; and
    determine whether an origin attribute of the code module indicates third party origin.

24. The system of claim 21, wherein the crash cause decision module includes instructions that are configured to cause the processor to:
    obtain a plurality of frames, each of said frames representing an address of code executed by the application during the last execution;
    determine, for each of a predetermined number of frames of the plurality of frames, whether an address of a frame is within an address range of a code module of a plurality of code modules loaded by the application during the last execution,
    each of said code modules having an address range associated with a respective code module;
    determine whether an origin attribute of the code module indicates third party origin; and
    identify a code module having the most frames within its address range and the origin attribute of third party as the cause of the crash of the application during its last execution.

25. The system of claim 24, comprising a supplemental code origin determination module including instructions embedded in the non-transitory machine readable medium for execution by the processor, the instructions, when executed, configured to cause the processor to:
    retrieve a descriptive attribute corresponding to an attribute type for the code module;
    retrieve a descriptive attribute for each of the application and an operating system of an attribute type that corresponds to the attribute type for the descriptive attribute for the code module; and
    set the origin attribute to third party origin based on a determination of whether the descriptive attribute of the code module does not match a descriptive attribute of the operating system and the descriptive attribute of the application.

26. A computer program product, implemented in a non-transitory machine readable medium storing instructions that, when executed by a processor, are configured to cause the processor to:
    determine that an application has crashed since its last execution because of execution of a third party supplemental code module;
    retrieve a supplemental code module name corresponding to the third party supplemental code module;
    retrieve a plurality of supplemental code module names corresponding to supplemental code modules that caused earlier crashes of the application; and
    check whether the name of the third party supplemental code module occurs a predetermined number of times in the plurality of supplemental code module names to determine a pattern of crashes caused by the third party supplemental code module; and
    selectively perform an action relative to the third party supplemental code module based on the checking, the action selected from the group consisting of uninstalling, disabling and loading the third party supplemental code module.

27. The computer program product of claim 26, wherein the instructions that are configured to cause the processor to selectively perform the action includes instructions that are configured to cause the processor to:
    present a user interface to a user identifying the third party supplemental code module that was responsible for crashing the application;
    query the user as to a selection of one of uninstalling, disabling and loading of the third party supplemental code module in response to the identification of the third party supplemental code module; and
    receive the user's selection in response to the query.

28. The computer program product of claim 27, wherein the instructions that are configured to cause the processor to present the user interface to the user identifying the third party supplemental code module include instructions that are configured to cause the processor to:
    present a suggestion on the user interface to contact the developer of the identified third party supplemental code module.

29. The computer program product of claim 26, including instructions that are configured to cause the processor to generate a hint for a supplemental code module when the supplemental code module is loaded into the application, the hint identifying a developer of the supplemental code module and a descriptive name for the supplemental code module.

* * * * *

UNITED STATES PATENT AND TRADEMARK OFFICE
CERTIFICATE OF CORRECTION

| | | |
|---|---|---|
| PATENT NO. | : 8,438,546 B2 | Page 1 of 1 |
| APPLICATION NO. | : 13/205827 | |
| DATED | : May 7, 2013 | |
| INVENTOR(S) | : Christopher A. Wolf | |

It is certified that error appears in the above-identified patent and that said Letters Patent is hereby corrected as shown below:

Title Page 2, column 2, line 5, item (56), under "OTHER PUBLICATIONS", please delete "Comuter." and insert --Computer.--, therefor.

Signed and Sealed this
Third Day of September, 2013

Teresa Stanek Rea
*Acting Director of the United States Patent and Trademark Office*